C. B. CARMAN.
ELECTRICALLY HEATED FIRELESS COOKER.
APPLICATION FILED JULY 20, 1916.

1,222,181.

Patented Apr. 10, 1917.

Carlyle B. Carman
Inventor

By Geo. P. Kimmel
Attorney

UNITED STATES PATENT OFFICE.

CARLYLE B. CARMAN, OF SALINEVILLE, OHIO.

ELECTRICALLY-HEATED FIRELESS COOKER.

1,222,181.  Specification of Letters Patent.  Patented Apr. 10, 1917.

Application filed July 20, 1916. Serial No. 110,322.

*To all whom it may concern:*

Be it known that I, CARLYLE B. CARMAN, a citizen of the United States, and resident of Salineville, in the county of Columbiana and State of Ohio, have invented certain new and useful Improvements in Electrically-Heated Fireless Cookers, of which the following is a specification.

The present invention relates to new and useful improvements in fireless cookers and has particular reference to an improved arrangement of heat generating element for use in connection with the fireless cooker.

One object of my invention is to provide an electrically operated heat generator for use in connection with the fireless cooker whereby to obviate the necessity of providing heat plates and the like.

Another object of my invention is to provide a fireless cooker of the class described which is simple in construction, strong and durable, cheap to manufacture and effective in operation.

Other objects and advantages to be derived from the use of my improved electrically heated fireless cooker will appear from the following detail description and the claims, taken with an inspection of the accompanying drawing, in which:—

Figure 1:
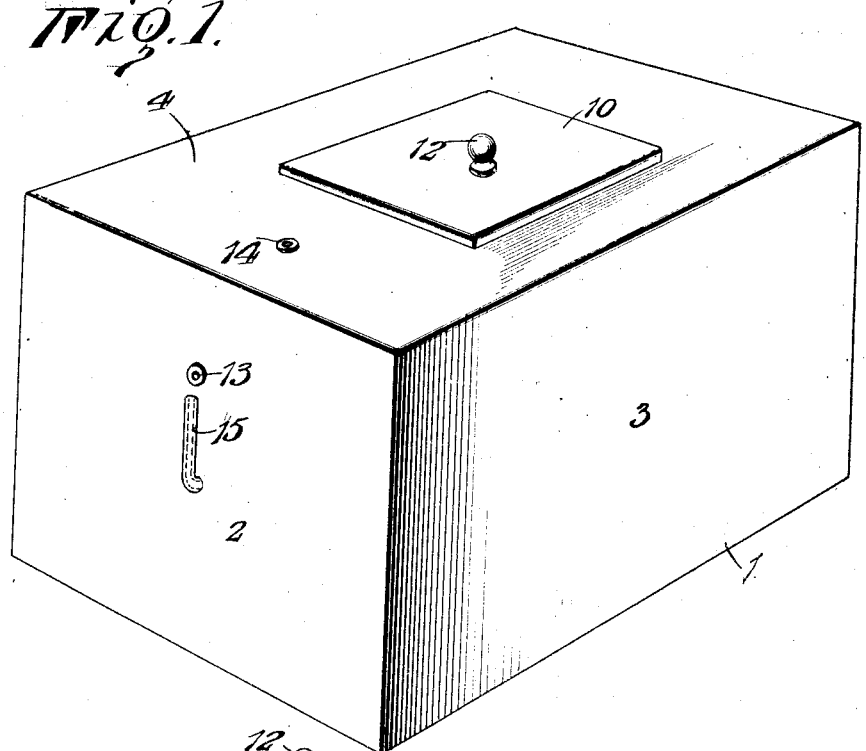
Figure 2:
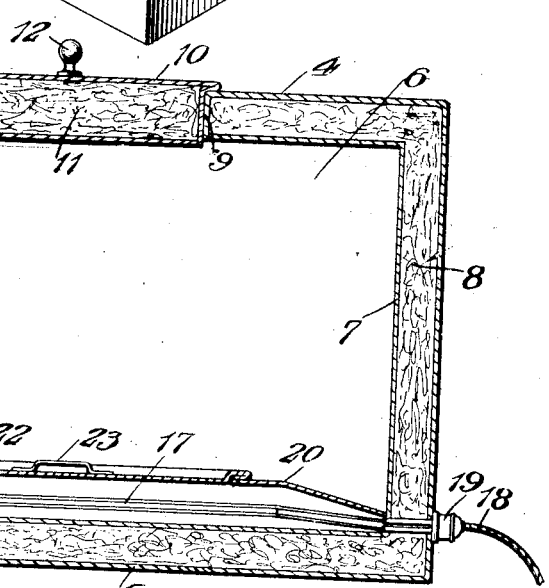

Figure 1 is a perspective view of a fireless cooker embodying the improvements of my invention; and Fig. 2 is a vertical longitudinal sectional view of the same.

Referring more particularly to the drawing, wherein similar characters of reference designate like and corresponding parts throughout the various views, 1 designates the body of my improved fireless cooker, the same being provided with end walls 2, side walls 3 and top and bottom walls 4 and 5, respectively. The cooking chamber is designated 6, an inner wall 7 being provided forming the top, bottom and sides and ends of said chamber. The wall 7 is spaced from the outer wall, said space being filled with heat and cold insulating means 8.

An opening 9 is provided in the top portions of the body 1, through which articles to be cooked may be inserted, a closure 10 being provided adapted to seat in said opening, said closure 10 having heat insulating means 11 associated therewith. A handle 12 is provided on said closure.

Relatively small heat exhausting or ventilating openings are provided in the form of tubes 13 and 14 extending from the heat chamber 6 to the outer walls of the body 1. A thermometer 15 is provided, the inner end 16 thereof being disposed in the chamber 6.

The heating device of my invention includes an electrical heating coil or similar electrical heating element designated 17, said heating element receiving current from a supply conduit 18 adapted to be connected to the body by a plug 19. A protecting flooring 20 is provided in the heat chamber 6, said flooring 20 being provided with an opening 21 closed by a cover 22, said cover being provided with a handle 23. If desired the articles to be cooked may be placed directly upon the heating coil or may be placed upon the cover as shown.

It will be seen that when starting the fireless cooker the heating coil may be energized giving the proper amount of heat for the cooking process. If desired the heat may be kept on during the cooking process, or may be turned off and any degree of heat may be obtained by the use of a rheostat interposed in the external circuit. Therefore, it will be seen that I have provided a fireless cooker having heating means associated therewith which is easily and simply constructed, and inexpensive to manufacture. It will be readily apparent that if so desired the thermometer may be arranged in different positions on the fireless cooker and the relative arrangement of the outlets 13 and 14 may be changed. I do not desire to be limited to the exact shape of the fireless cooker in view of the fact that the same may be round or any desired shape. Of course, if desired, any number of cooking chambers may be provided as I do not limit myself to the use of one chamber or heater.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made on said structure as do not depart from the spirit and scope of the invention as claimed.

Having thus fully described my invention, what I claim as new and desire to secure by Letters Patent, is:

1. A fireless cooker of the class described including a substantially rectangular shaped body, a flooring correspondingly shaped to the bottom of said body and adapted to be positioned thereon, said flooring having a raised central portion with an opening therein, an electrically controlled heating unit placed beneath said raised portion of the flooring, and a closure for the opening in the flooring whereby articles to be cooked may be placed directly on the heating unit, or positioned above the same.

2. The combination with a fireless cooker including a substantially rectangular shaped body having a double wall construction with a heat retaining filler placed therebetween, excessive heat outlet means associated with said body, said body having an opening in its top wall, a removable closure for the same, of an electrically controlled heating unit arranged on the bottom inner wall of said body, a current supply means therefor, a flooring on said body having a central raised portion disposed over the heating unit, and a removable closure in said raised portion disposed in alinement with the opening in the top of the body.

In testimony whereof, I affix my signature hereto.

CARLYLE B. CARMAN.